United States Patent
Lakshmanan et al.

(10) Patent No.: US 10,146,789 B1
(45) Date of Patent: *Dec. 4, 2018

(54) IDENTIFYING AND UTILIZING SYNCHRONIZED CONTENT

(71) Applicant: AMAZON TECHNOLOGIES, INC., Reno, NV (US)

(72) Inventors: Geetika Tewari Lakshmanan, Winchester, MA (US); Mitch Ray Kendall, Somerville, MA (US); Puneet Girdhar, Scotch Plains, NJ (US)

(73) Assignee: Amazon Technologies, Inc., Reno, NV (US)

( * ) Notice: Subject to any disclaimer, the term of this patent is extended or adjusted under 35 U.S.C. 154(b) by 229 days.

This patent is subject to a terminal disclaimer.

(21) Appl. No.: 14/788,523

(22) Filed: Jun. 30, 2015

(51) Int. Cl.
  *G06F 17/30* (2006.01)
  *G06F 3/00* (2006.01)
  *G09B 5/06* (2006.01)
  *G06F 3/0483* (2013.01)

(52) U.S. Cl.
  CPC ...... *G06F 17/30174* (2013.01); *G06F 3/0483* (2013.01); *G06F 17/30088* (2013.01); *G06F 17/30356* (2013.01); *G06F 17/30746* (2013.01); *G09B 5/062* (2013.01)

(58) Field of Classification Search
  CPC .. G06F 17/30746; G06F 3/0483; G09B 5/062
  See application file for complete search history.

(56) References Cited

U.S. PATENT DOCUMENTS

| | | | |
|---|---|---|---|
| 9,128,591 B1* | 9/2015 | Arora | G06F 17/30876 |
| 9,213,705 B1* | 12/2015 | Story, Jr. | G06F 17/30056 |
| 9,317,500 B2* | 4/2016 | Hwang | G06F 17/2827 |
| 2011/0231474 A1* | 9/2011 | Locker | G06F 17/30058 709/203 |
| 2012/0246343 A1* | 9/2012 | Story, Jr. | H04L 67/1095 709/248 |

(Continued)

OTHER PUBLICATIONS

Office Action for U.S. Appl. No. 14/788,492, dated Oct. 20, 2017, Kendall, "Identifying and Utilizing Synchronized Content", 25 pages.

(Continued)

*Primary Examiner* — William Spieler
(74) *Attorney, Agent, or Firm* — Lee & Hayes, PLLC

(57) ABSTRACT

Methods, systems and apparatus for identifying and utilizing content synchronization information are described. Methods for creating and utilizing a synchronization file that can be used to notify users when synchronization availability exists, and to identify ways to repair synchronization unavailability are described. The synchronization file includes a complete set of individual content elements that make up a content item, such as a book, where each content element has an indication whether play-back of an audio version of the content item can be synchronized with the presentation of a corresponding text version of the content item. Methods, systems and apparatus are al'so disclosed for providing the synchronization availability information to the user in a manner that enables the user to increase the benefits of synchronized presentation of the content item.

16 Claims, 11 Drawing Sheets

(56) References Cited

U.S. PATENT DOCUMENTS

| | | | |
|---|---|---|---|
| 2013/0073449 A1* | 3/2013 | Voynow | G06Q 30/0601 705/39 |
| 2014/0039887 A1* | 2/2014 | Dzik | G10L 15/26 704/235 |
| 2014/0281982 A1* | 9/2014 | Clark | G06F 3/0481 715/716 |
| 2015/0089368 A1* | 3/2015 | Lester | G06F 17/30778 715/716 |

OTHER PUBLICATIONS

Office Action for U.S. Appl. No. 14/788,492, dated Feb. 7, 2018, Kendall, "Identifying and Utilizing Synchronized Content", 20 pages.

* cited by examiner

FIG. 1

| DATA START POSITION 102 | DATA END POSITION 104 | TIME START POSITION 106 | TIME END POSITION 108 | CONTENT ELEMENT 110 |
|---|---|---|---|---|
| 12572 | 12573 | 23.033 | 23.136 | the |
| 12603 | 12611 | 23.973 | 24.395 | looking |
| 12613 | 12615 | 25.396 | 24.536 | for |
| 12617 | 12624 | 24.537 | 24.865 | his |
| 12646 | 12653 | 25.571 | 25.899 | the |
| 12655 | 12657 | 25.900 | 26.040 | way |

| DATA START POSITION 202 | DATA END POSITION 204 | TIME START POSITION 206 | TIME END POSITION 208 | CONTENT ELEMENT 210 |
|---|---|---|---|---|
| 12575 | 12592 | #### | #### | boy |
| 12594 | 12601 | #### | #### | went |
| 12626 | 12630 | #### | #### | dog |
| 12630 | 12635 | #### | #### | on |

| DATA START POSITION 222 | DATA END POSITION 224 | TIME START POSITION 226 | TIME END POSITION 228 | CONTENT ELEMENT 230 |
|---|---|---|---|---|
| #### | #### | 26.041 | 26.322 | he |
| #### | #### | 26.323 | 26.510 | found |
| #### | #### | 26.511 | 26.651 | money |

232a — 232c

| | DATA START POSITION | DATA END POSITION | TIME START POSITION | TIME END POSITION | CONTENT ELEMENT |
|---|---|---|---|---|---|
| 312a | 12572 | 12573 | 23.033 | 23.136 | the |
| 312b | 12575 | 12592 | #### | #### | boy |
| 312c | 12594 | 12601 | #### | #### | went |
| 312d | 12603 | 12611 | 23.973 | 24.395 | looking |
| 312e | 12613 | 12615 | 24.396 | 24.536 | for |
| 312f | 12617 | 12624 | 24.537 | 24.865 | his |
| 312g | 12626 | 12630 | #### | #### | dog |
| 312h | 12630 | 12635 | #### | #### | on |
| 312i | 12646 | 12653 | 25.571 | 25.899 | the |
| 312j | 12655 | 12657 | 25.900 | 26.040 | way |
| 312k | #### | #### | 26.041 | 26.322 | he |
| 312l | #### | #### | 26.323 | 26.510 | found |
| 312m | #### | #### | 26.511 | 26.651 | money |

300

302 — DATA START POSITION
304 — DATA END POSITION
306 — TIME START POSITION
308 — TIME END POSITION
310 — CONTENT ELEMENT

FIG. 3

| | DATA START POSITION | DATA END POSITION | TIME START POSITION | TIME END POSITION | CONTENT ELEMENT |
|---|---|---|---|---|---|
| 412a | 12572 | 12573 | 23.033 | 23.136 | the |
| 412b | 12575 | 12592 | #### | #### | boy |
| 412c | 12594 | 12601 | #### | #### | went |
| 412d | 12603 | 12611 | 23.973 | 24.395 | looking |
| 412e | 12613 | 12615 | 24.396 | 24.536 | for |
| 412f | 12617 | 12624 | 24.537 | 24.865 | his |
| 412g | 12626 | 12630 | #### | #### | dog |
| 412h | #### | #### | 24.870 | 25.005 | log |
| 412i | 12630 | 12635 | 25.015 | 25.035 | on |
| 412j | 12646 | 12653 | #### | #### | the |
| 412k | #### | #### | 25.155 | 25.560 | sea |
| 412l | 12655 | 12657 | 25.900 | 26.040 | way |
| 412m | #### | #### | 26.041 | 26.322 | he |
| 412n | #### | #### | 26.323 | 26.510 | found |
| 412o | #### | #### | 26.511 | 26.651 | money |

FIG. 4

IDENTIFYING AND UTILIZING SYNCHRONIZED CONTENT

BACKGROUND

Each passing day, more and more consumers utilize portable computing devices to "read" content, such as books, magazines and the like. In many instances, the content can be presented to the user on devices such as e-readers, tablets, smart phones, laptop computers, etc., which can store many books and/or magazines, etc., simultaneously to make it more convenient for the user. In other instances, the content can be stored as audiobooks, in which case the user can listen to the content, such as while driving a vehicle. There have also been efforts to provide users with the ability to read or follow along on an e-reader while an audio version of the content is played-back.

Some of these attempts, however, can produce frustrating results for the users, such as when the synchronization between the text version of the content does not accurately track the audio version of the content. Such circumstances can actually be counter-productive to what the user might have been trying to accomplish, such as in trying to learn or improve their skills in language in which the content is presented. In other instances, there may simply not be any synchronization between the textual version and the audio version for a given portion of the content, which can also be frustrating from the user's perspective.

BRIEF DESCRIPTION OF DRAWINGS

FIG. 1 shows a table diagram of a data file that illustrates a conventional manner for keeping track of when content in different formats is synchronized with each other;

FIG. 2A shows a table diagram of a portion of data file that illustrates when an audio version of a content item is unavailable in accordance with embodiments of the present disclosure;

FIG. 2B shows a table diagram of a portion of a data file that illustrates when a textual version of a content item is unavailable in accordance with embodiments of the present disclosure;

FIG. 3 shows a table diagram of a portion of a data file that illustrates when textual and audio versions of a content item can be utilized synchronously in accordance with embodiments of the present disclosure;

FIG. 4 shows a table diagram of a portion of a data file that illustrates when misalignment can occur between textual and audio versions of a content item in accordance with embodiments of the present disclosure;

DETAILED DESCRIPTION

Figure 5:
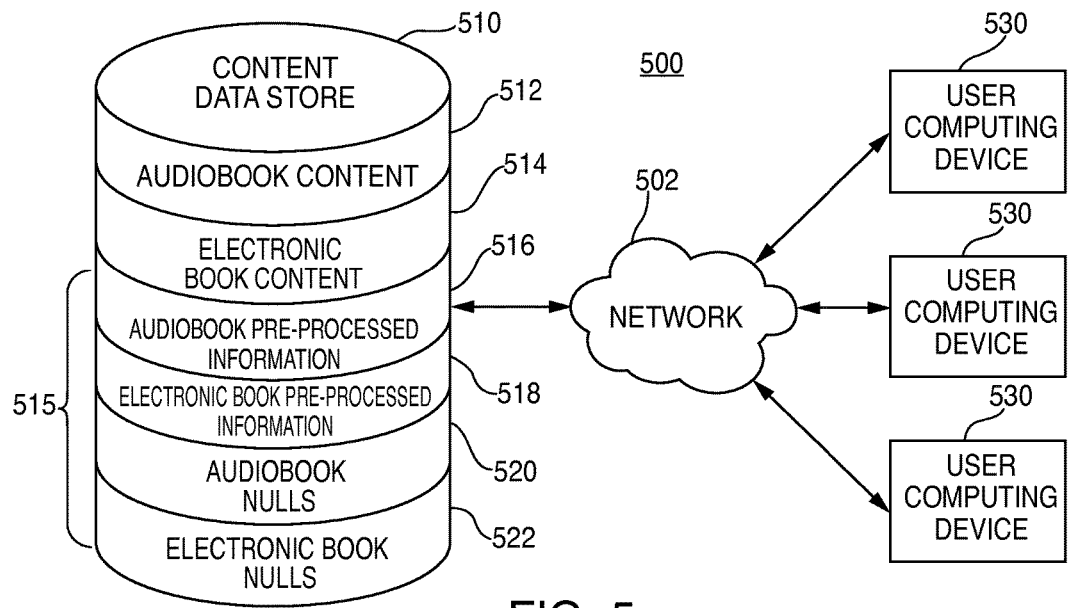
FIG. 5 shows a schematic block diagram of an illustrative network environment for providing synchronized presentation of audio and text versions of a content item in accordance with embodiments of the present disclosure.

The present disclosure, as set forth below, is directed to various embodiments of systems, methods and apparatus for enabling the presentation of text to be synchronized with the audio playback of a content item, such as a book, magazine, article, or the like. In some embodiments, a synchronization file is created utilizing, for a given content item, an audio file and a text file, which are both pre-processed. The synchronization file can include, for each content element, an indication of the location of where that content element can be found in the text file, an indication of when a given content element can be found in the audio file, as well as indications for a given context element of where text data or audio data cannot be determined, which are referred to as nulls. The inclusion of nulls in the synchronization files enables various embodiments disclosed herein to provide one or more indications regarding the ability to synchronize the display of text with the audio playback for a given content item. For example, the inclusion of nulls can enable a determination of things such as the overall quality of available synchronization for a given content item, the percentage of that contact item for which synchronization may be available, and recommendations for which content items to review based on synchronization data, etc.

In some embodiments, the audio version of the content can be pre-processed, which may result in some or all of the audio file being successfully converted to text. This may include, for example, when a speech-to-text (STT) translation is performed on the audio file of a selected content item, such as a book, magazine, newspaper, comic, journal or other textual material. In that instance, some or all of the audio file may be processed and aligned with the text version of the content item such that some or all of the content item may be played back on a user computing device, such as a mobile phone or table computing device while the text version of the same content is highlighted in a synchronized manner. The overall percentage of success of synchronization between audio and text versions for a content item can be provided to a user in various ways to help that user select which content items may be the most beneficial to review. For example, if a user is attempting to expand their knowledge of a language, it may be beneficial for that user to listen to the pronunciation of the content item in the language while viewing the text presentation of the same content on a computing device, such as a tablet computer. In that instance, for example, the synchronized presentation of the text could include an indicator, such as a highlighting, that generally tracks the audio playback of the content item. For example, it may be more helpful for the text presentation of the content item to include highlighting on a line by line basis, or paragraph by paragraph, rather than word by word as the audio is played back In stances where the synchronization file for the content items contained nulls, the highlighting would cease (either permanently or temporarily) and the user could simply listen to the audio playback until the next portion of "synchronized" reading was available.

In accordance with some embodiments, the inclusion of the locations in the synchronization file of where synchronization of the text presentation and audio playback is or is not available can be utilized to improve the user experience. For example, the user computing device could track the nulls in the synchronization file to estimate the approximate time at which synchronization availability will resume and provide the user with an appropriate indication. This could include a count-down or message flashed across the screen such as "Get Ready, Get Set, Go," as synchronized use of the content item is resumed. This may help to keep the user engaged and excited as the presentation and playback of the content item continues. In other embodiments, the user may be given the option of proceeding with text-only or audio-only access to the content item (for example, if the availability of synchronization between text and audio formats falls below a threshold level).

In some embodiments, the identification of portions of the content item where synchronization is available or are nulls (i.e., portions of the content item where, for whatever reason, synchronization between text and audio versions is not available) aid in improving the overall synchronization quality by making it easier and more efficient to identify the places where improvement is needed. In this manner, for example, by including instances in the synchronization file where content is only present for one of the text and audio versions, the nulls help to identify which format needs to be analyzed further. In other embodiments, there may be a mismatch or alignment error, such as when both content formats indicate that content is present, but it is difficult to align the text with the audio without mismatches. Errors such as these would be difficult or impossible to detect without the inclusion of the nulls. By including the nulls in the synchronization file for an entire given content item, it may be more easy to utilize synchronized presentation of the content (for example, only chapters 3-8 of a given book might be presented because only those chapters can be presented in a synchronized manner).

In some embodiments, the inclusion of which contents elements can be presented in a synchronized manner and nulls in a single data file (which generally indicate which content elements for which synchronized presentation is not available), can be used to compile metrics that can be used for a variety of purposes. For example, as briefly discussed above, one metric can be a health metric that indicates an overall measurement of amount of synchronized presentation available for a given content item. In addition, the quality of available synchronization for a content item could be displayed for a user in a manner so that the user could easily identify which portions of the content item can be highly synchronized, and only utilize that portion if the main goal of that user is to use synchronized presentation for the content item (i.e., presentation of the text and playback of the audio simultaneously). In still other situations, such as when a section of poorly synchronized "hot spots" are being experienced, the user could be given the option to skip ahead to the next region where more consistent synchronization is available.

In some embodiments where metrics are to be utilized, it may be beneficial to establish a criteria for forming a metric that can be consistently measured and applied. For example, one metric of overall synchronization availability and health could be created by using three different factors, and applying those factors to every content item. One factor could be the number of content elements where synchronization is not available within the content item. This could, for example, be accounted for whenever nulls are present for more than 2 seconds. A second factor could be the total amount of time a given content item has no synchronous presentation available. This may, for example, be measured with regard to an entire content item, or it might be measured for portions of a content item, such as for each chapter in a book. A third factor could be the average of the duration of each portion of the content item where synchronization is unavailable. The three factors could then be combined to determine a metric for the overall synchronization availability and health of the content item.

FIG. 1 shows a table diagram of a portion of synchronization file 100 that only includes content elements when there is data available for both text and audio versions of the content item (e.g., a content item can consist of content elements, such as when a book can be considered to be a content item and the individual words can be considered to be the content elements). In particular, synchronization file 100 includes data start position 102, data end position 104, time start position 106, time end position 108 and content element 110 for each individual instance (collectively referred to as "line 112X") in which synchronized presentation is available of the text and audio files, simultaneously. Content element 110 may, for example refer to any content or any portion of content, such as an individual word, a phoneme (any perceptibly distinct unit of sound in a language that can be distinguished from another), etc. For purposes and ease of illustration, the individual elements of text shown in the figures are all individual English words. Persons skilled in the art will appreciate that principles disclosed here may be to individual words or portions of words without departing from the spirit of the present invention. Accordingly, the embodiments disclosed herein may be applied equally to any other language, such as Chinese, Japanese, French, etc., using individual words from the selected language or portions of words of words such as phonemes.

The text files, for example, may be measured in terms of data size such as where an electronic book may encompass a 100 megabyte sized file and 25% progress through the electronic book may equate to being at roughly the 25 MB mark through the data file; the audio files may be measured in terms of time such as where an audiobook may encompass a 2 hour and 30 minute span of time and 40% progress through the audiobook may equate to being one hour into the data file. This may be more clearly illustrated in terms of what is shown in FIG. 1. For example, the content element "the" in text format starts at data position 12646 and ends at data position 12653 in the electronic book data file, while the audiobook that corresponds to the same content item as the electronic book locates "the" beginning at time 25.571 (i.e., slightly more than 25½ seconds) and ending at time 25.899 (i.e., almost 25.9 seconds). Each of the individual content elements are indicated by a corresponding reference numeral 112, such as "The" is referred to by reference numeral 112a; "looking" is 112b, "for" is 112c, "his" is 112d, and "way" is 112f.

As noted above, synchronization file 100 only includes data for instances in which the text format and for the audio format of the content item match such that synchronous playback would be available to a user. If a user selected the content item for presentation, any synchronized display features would simply stop whenever a data position occurred outside any of the start/end ranges listed in synchronization file 100 (or, with regard to the audio file, outside the start/end time positions listed), and the user might be left wondering if and when the next portion of synchronized material might be available.

FIG. 2A shows another table diagram of a portion of a different synchronization file 200 in accordance with the principles disclosed herein. Synchronization file 200 differs from synchronization file 100 because file 200 not only includes instances in which pre-processed data exists for a given content element, it also includes nulls where there is not useful pre-processed data for that same given content element. In those instances, the "data" for the data and/or time positions is simply indicated as "null" (null can refer to the absence of available information for any given content element, such that synchronized presentation of text and audio formats for a given portion of a content item is not available—such as a series of 0.5 second intervals of pre-processed data interspersed with 3 second intervals of unknown content elements). The formatting is similar to synchronization file 100, in that synchronization file 200 includes data start position 202, data end position 204 (when synchronization is available to the end user), and nulls for each instance of a content element when synchronized presentation is not available (which collectively are referred to as element 212x (including "boy" as element 212a, "went" as element 212b, "dog" as element 212c and "on" as element 212d). In synchronization file 200, however, only instances where nulls correspond to the audio file are included.

FIG. 2B shows another table diagram of a portion of a different synchronization file 250 in accordance with the principles disclosed herein. Synchronization file 250 differs from synchronization file 200 in that synchronization file 250 only includes instances in which useful content data exists for a given content element that corresponds to the audio file for the content item, and where there is not useful audio data for that same given content element, nulls exist (as described above). The formatting is similar to synchronization file 100, in that synchronization file 250 includes data start position 222, data end position 224 (both of which include nulls), and time start position 226 and time end position 228 for each instance of a content element where audio information is known (which are generally referred to as elements 232x) (including "he" as element 232a, "found" as element 232b, and "money" as element 232c).

FIG. 3 shows a table diagram of a portion of synchronization file 300 that includes both pre-processed information and nulls for a selected content item (such as a book, chapter of a book, magazine, newspaper, journal, etc.). In particular, synchronization file 300 includes data start position 302, data end position 304, time start position 306, time end position 308, and content element 310 for each individual instance of content (generally referred to as "line 312x"). Synchronization file 300, unlike synchronization files 100, 200 and 250, can be a single file that represents an entire content item, instead of just a portion, or a significant portion of a content item, such as the chapter of a book, in order to manage the size of individual files. In particular, synchronization file 300 can include an individual line 312x for each individual content element regardless of whether that content element can be presented to the user in a synchronized manner. As such, one could read sequentially down content element column 310 to see consecutive content elements, such as "the boy went looking for his dog. On the way he found money" (provided there are not any alignment errors, which are discussed below in connection with FIG. 4). For example, content element 312a "the" includes presentation information for both the text and audio formats, while element 312b "boy" includes presentation information for the text and nulls for the audio; and element 312k "he" includes nulls for the text and presentation information for the audio.

Including each individual content element (or at least the vast majority of them) in a single synchronization file provides many advantages in accordance with principles of the present invention. In particular, by including all or basically all of the individual content elements in a single file regardless of whether presentation information or nulls exists provides readily available insight into the overall quality of the available synchronization for a given content item, as well as providing the capability to see visually which portions of the content item have a high percentage of available synchronization for presentation and which do not. For example, in viewing FIG. 3, it is readily apparent that the text version of the content item has an excellent level of synchronization availability until the very end of the content item is reached. The loss of available synchronization regarding text may occur, for example, if the narrator on the audio version provides narrative that is not included in the text itself (e.g., such as a personal view on what the story or chapter might mean), or if the audio version of the text is updated with new content prior to the text version being updated. FIG. 3 also shows that the audio portion also has a high degree of available synchronized presentation, but that there are two small areas where synchronized presentation is lacking. When viewed in the combined manner provided by synchronization file 300 in FIG. 3, however, it becomes readily apparent that only half of the content item is available for synchronized presentation using both text and audio formats simultaneously.

The ease with which the overall quality and availability of synchronized presentation can be evaluated, and the ability to easily identify "hot spots" that are in need of correction, makes file 300 an invaluable asset to quality control personnel who prepare and maintain electronic content items for public use. For example, a quality control professional could view a synchronization file, see a series of "hot spots" for which synchronization is unavailable, and click on the words at issue to hear how the audio version sounds in order to determine the potential issue causing the failure to correctly pre-process the data, and then to correct the pre-processed information for those words (or individual content elements).

In some embodiments, the combination of the pre-processed information and nulls can be utilized to create metrics that can quickly provide detailed insight into the quality and availability of synchronized presentation for a given content item. For example, one way in which audio read-back and text presentation of the same content item can be combined is the case where a user computing device displays the content while at the same time providing audio playback of that item. If the audio and text files are properly synced to each other, an indicator can be displayed to highlight the text that corresponds to the audio as the device reads the audio aloud. The indicator can then track the text as it is read line by line, for example, highlighting each line as they automatically scroll up on the display. In this way, a user who might be trying to learn or improve his/her knowledge of that language can use the tracking feature during audio playback to hear how the text should sound, how words or syllables are emphasized, etc., while also viewing the text Therefore, it could be beneficial to provide that user with an indication of the overall quality and synchronization availability for that content item to help guide the user to content items that would be more useful (i.e., that have a higher level of synchronization availability). Moreover, it might be even more useful to provide that user with metrics that show the user the best portions of the given content item, from the perspective of synchronization availability, so that the user could simply go to that section instead of waiting for the areas of a high degree of synchronization availability to occur during the read-back (some of these metrics and how they may be used are described more fully below).

FIG. 4 shows a table diagram of a portion of synchronization file 400 that also includes both pre-processed information and nulls for a selected content item (such as a book, chapter of a book, magazine, newspaper, journal, etc.). In particular, synchronization file 400 includes data start position 402, data end position 404, time start position 406, time end position 408, and content element 410 for each individual instance of content (generally referred to as "line 412x"). Synchronization file 400, like synchronization file 300, can be a single file that represents an entire content item (or a significant portion of a content item, such as the chapter of a book, in order to manage the size of individual files). In particular, synchronization file 400 can include an individual line 412x for each individual element of content regardless of whether pre-processed information or nulls exists for the text and audio formats of the individual content elements of the content item. Synchronization file 400, however, may also be used to illustrate an additional problem that may occur with trying to present content files in a synchronized manner, such as when potential mis-alignment can occur. As the example shown in FIG. 4 illustrates, there exists more than one instance of pre-processed data for a given content element. In particular, the synchronization availability depends on whether the text or audio output for the same content item is to be relied upon. If the text is used, then lines 412g, 412i and 412j would provide the phrase "dog on the." If the audio is used, however, then lines 412h, 412i and 412k would provide the phrase "log on sea." Looking at FIG. 4, the apparent misalignment can be easily discovered due to the alternating columns and alternating rows in which the nulls appear (the information is listed in synchronization file 400 in sequence). This type of error would be virtually impossible to detect if a synchronization file were used that only provided data when the file was available for synchronized presentation for both text and audio files. Using file 400, however, a quality control employee could quickly identify the misalignment, select the proper version of the content elements to use, and adjust either the text or audio to match the other, thereby improving the overall quality of the synchronization files and thus the availability of synchronized presentation to the user.

FIG. 5 shows an illustrative network environment 500 that may include network 502 connected to content data store 510 and user-computing devices 530. Network 502 can be any network, wired or wireless, including personal area networks, local area networks, wide-area networks, and the like. User-computing device 530 may be any device capable of communicating over network 502 via any number of standards, such as Wi-Fi, cellular access, Bluetooth access, a direct Ethernet connection, telephone dial-in, etc. In particular, user-computing device 530 may be any network capable device such as a laptop or tablet computer, personal digital assistant (PDA), mobile phone, electronic book reader, set-top box, audio player, gaming system and the like. User-computing device 530 may generally provide the user with the capability to listen to audio information corresponding to individual content items, and to display text information about those content items. Content data store 510 stores information related to individual content items, such as books, magazines, newspapers, journals, comic books, etc. The audio can be output through one or more individual speakers, an audio jack to headphones, via a Bluetooth connection to external speakers, etc.

Depending on the individual content item, content data store 510 can include an audio version, such as audiobook content 512, a text version such as electronic book content 514, and a synchronization file 515 that can include audio pre-processing information 516, text pre-processing information 518, audio nulls 520, and text nulls 522. Persons skilled in the art will appreciate that while FIG. 5 shows each different type of information available to synchronization file 515 separately, in accordance with various embodiments disclosed herein, the information can be gathered in a single synchronization file 515 and utilized as shown in FIGS. 3 and 4 and described above.

Accordingly, network environment 500 can be utilized by a user operating any one of user-computing devices 530 to download a content item for which synchronized presentation may be available (e.g., a book on the history of the Super Bowl). In that case, the user would send a request from the selected user-computing device 530 through network 502 to content data store 510. Content data store 510 would respond to the request by accessing the audio and text versions of the content item, and the synchronization file corresponding to the content item. Those files would then be transmitted by the content data store, via network 502, to the appropriate user-computing device 530 for use by the user. If the user then selects synchronized play-back, the device would then access the synchronization file, the text file, and the audio file, and proceed with the presentation of the content item in a synchronized manner such that the text highlighted by system corresponds to the audio being played back depending on the level of synchronization available for any given content element.

Figure 6:
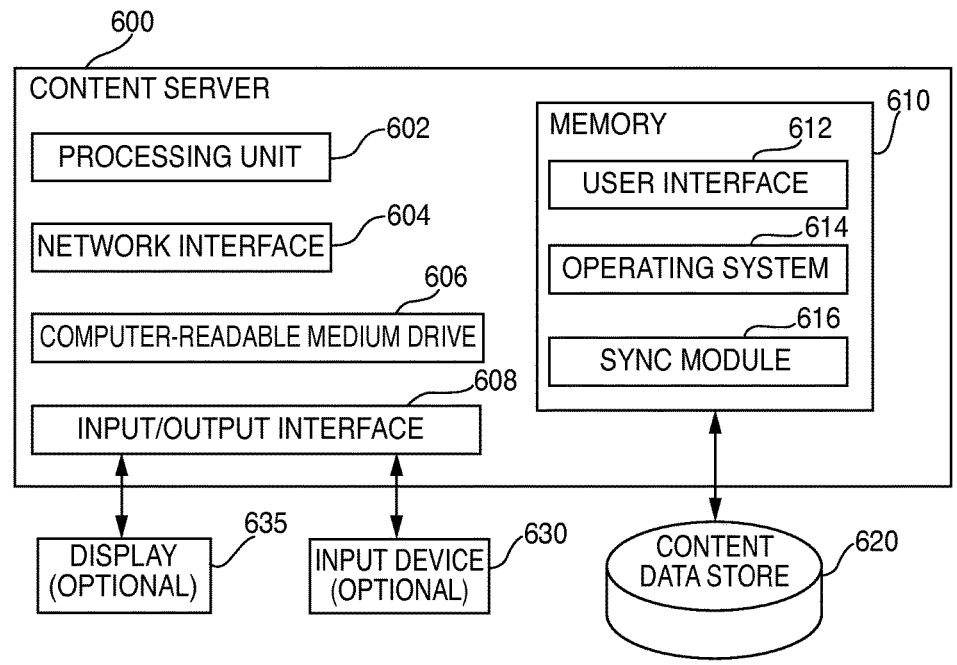
FIG. 6 shows a schematic block diagram of an illustrative content server in accordance with embodiments of the present disclosure.

FIG. 6 shows an illustrative schematic diagram of a content server 600 that may be utilized to prepare, compile and/or otherwise generate audio, text and synchronization files for use by user-computing devices 530. Content server 600 may include processing unit 602, network interface unit 604 (that may interface with a network such as network 502 described above with respect to FIG. 5), computer readable medium drive 606 (that provides permanent storage capability, such as through one or more hard drives coupled together, or via FLASH memory modules, etc.), input/output circuitry 608 and memory 610. Memory 610 may itself be formed of additional modules such as user interface module 612, operating systems module 614 and sync module 616. Memory 610 may also provide the completed files to content data store 620 for distribution to users via network 502 as described above.

Content server 600 may be used to prepare, compile and/or otherwise generate audio, text and synchronization files as is described in more detail below. Briefly with regard to what is shown in FIG. 6, a given content item (such as a book, chapter of a book, magazine, newspaper, comic book, journal, etc.) can have an audio recording associated with it, as well as a textual representation. The audio recording (which may be previously recorded) could be input, through network 502 and network interface 604 (or via input/output interface 608) into drive 606 for storage. Processing unit 602 may receive the audio recording and process it through text-to-speech processing to produce audio pre-processed information and nulls for the given content item. Processing unit 602 could also process the text of the given content item to produce text pre-processing information and nulls (the sequence of which gets pre-processed first—text or audio— is of no consequence to the principles disclosed herein). Once the audio and text pre-processed information and nulls have been produced, processing unit 602 compiles them in sequence to form the synchronization file in the manner described above and shown in FIGS. 3 and 4. Moreover, processing unit 602 may also analyze the synchronization file (either in conjunction with producing it or in a completely separate operation or series of operations) in order to produce one or more metrics that can be used to describe overall and detailed quality attributes of the synchronization file (which are described more fully below).

Figure 7:
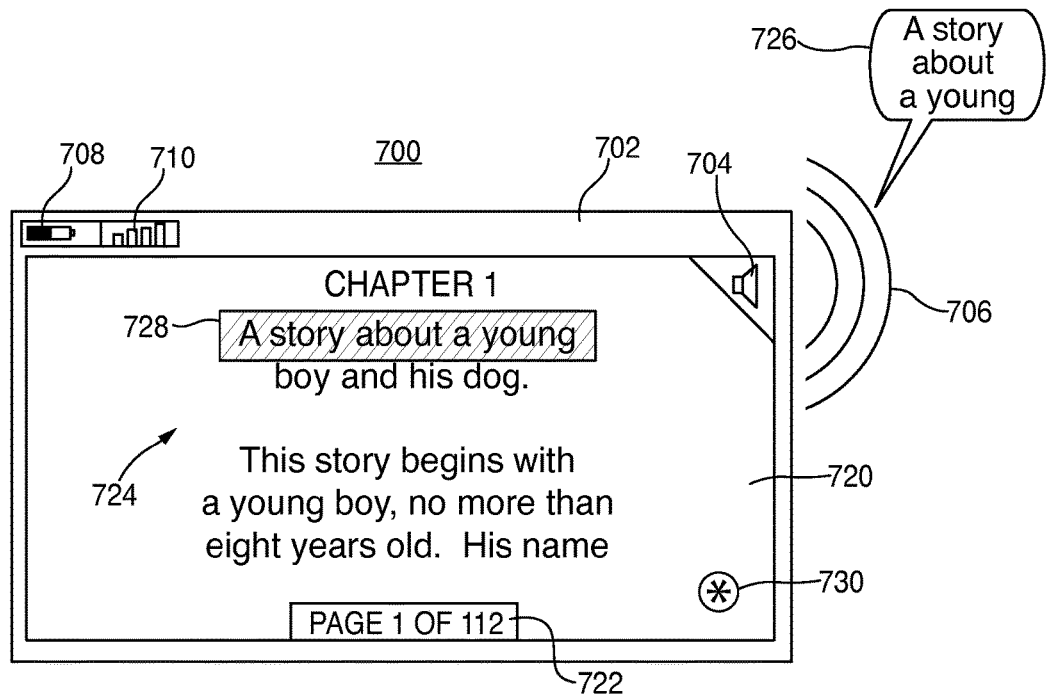
FIG. 7. is an illustrative schematic diagram of a user computing device in which an example of presenting audio and text versions of a content item in a synchronized manner is shown in accordance with embodiments of the present disclosure.

FIG. 7 is an illustrative schematic diagram of a user-computing device 700 in accordance with the embodiments disclosed herein. User computing device 700 includes display screen 702 and speaker 704 (although speaker 704 is illustrated as being physically outside or separate from display 702, it is likely to be an internal component configured to emit sound through the body of device 700, such as through a series of perforated holes designed to permit sound from speaker 704 to emanate from device 700). Speaker 704 is configured to produced audio, such as is shown by illustrative sound waves 706. Display 702 may include a battery icon 708 that shows the charging status of an internal battery (not shown), connectivity icon 710 that shows whether device 700 is connected to a network such as network 502, and if so, the relative strength of the network connection signal (while a cell service indicator is shown in FIG. 7, it should be understood that the icon could switch to a Wi-Fi icon if device 700 was connected to a network via Wi-Fi, or a separate icon may be used). These icons are shown for purposes of illustration and are not included in the examples of other embodiments shown in FIGS. 8 and 9 (persons skilled in the art will appreciate that the icons could be included in those examples as well without effecting the principles disclosed herein).

Device 700 also includes a main display 702 that can be utilized for a variety of different things. In the example shown in FIG. 7, display 702 is being utilized primarily as a display for an electronic reader function that is indicated generally in area 720. In this case, the given content item is a book called a Boy And His Dog, and display 720 shows the book from the beginning, which is illustrated by page status icon 722 (currently showing that the book is on page 1 of 112). The text from the story is generally presented on display 702 as shown by text 724. In addition to the text version of the book, an audio version (such as an audiobook or the like) can also be utilized as can be seen from illustrative text bubble 726. Additionally, a synchronization availability indicator 728 can being utilized to highlight that portion of the text that is currently being presented while it is simultaneously being output via speaker 704. For example, FIG. 7 shows that the text "A story about a young" is highlighted by highlight 728 (which could automatically move, or the text could automatically translate up the screen underneath the highlighting). At the same time, speaker 704 is playing sound 706 that can be heard as the text in illustrative bubble 726 as "A story about a young," which matches the highlighted text. As long as the data in the synchronization file shows that synchronization is available by the lack of nulls or by the fact that pre-processed information exists for both the audio and text versions of the given content item (i.e., in this case the book A Boy And His Dog), the highlighting should continue to move to other text that should match the audio being produced by speaker 704.

When the processor looks ahead into the synchronization file and determines that the availability of synchronization is coming up due to the existence of one or more nulls, alarm icon 130 can be utilized to notify how to interact with the user to that affect. In addition, flashing alarm icon 730 could also be used as, for example, a count-down to let the user know how much more time will pass before synchronization will again be available (in which case alarm signal icon 730 could be replaced by a number that counts down the seconds before synchronization availability ends). In some embodiments, after synchronization availability has been lost, alarm signal icon 730 could be used to inform the user as to how much time needs to pass before synchronization availability will begin again (in which case icon 730 could again count down). The capability to provide the user with indicators regarding the current or future status of synchronization availability, in accordance with the principles disclosed herein, based on the inclusion in the synchronization file of essentially all of the individual content elements regardless of whether the corresponding synchronization file has pre-processed information and/or nulls. One alternative to alarm icon 730 could be for the background color of display field 720 to vary depending on the synchronization health status. For example, the background could be a light green when all is well, meaning that current synchronization availability and foreseeable synchronization availability (which could be based on a threshold amount of time into the future, such as 5 or 10 minutes) are successful. Once the threshold into the future changes due to an upcoming null or nulls in the synchronization file, the background color could change to yellow, and then, as the null gets closer than a second threshold (for example, 30 seconds), the background color could change to red. Keeping the user informed of the status of synchronization availability and potential changes may help to reduce any potential frustration and thereby improve the overall user experience.

Alarm icon 730, in other alternative embodiments, can be replaced with a user selectable icon that can provide the user with options in the event that synchronization availability is lost or, when device 700 determines that synchronization availability is going to be lost by looking forward into the synchronization file as described above. Instead of (or in addition to) providing a user with an alarm, icon 730 can be replaced with one or more user accessible "buttons" (which may simply be active portions of a touch screen). These buttons can offer a user the option, in the event of a loss of synchronization availability, to change the mode of operation of device 700 such that text-only presentation of the content item continues, or audio-only playback of the content item is used. In addition, by looking forward in the total synchronization file, device 700 could then give a user operating in audio-only mode, for example, with the option to return to synchronized presentation mode in the event that "good" synchronization is or will become available. Each of these options can be used in combination with one another to provide a more enhanced and beneficial experience for the user.

Figure 8:
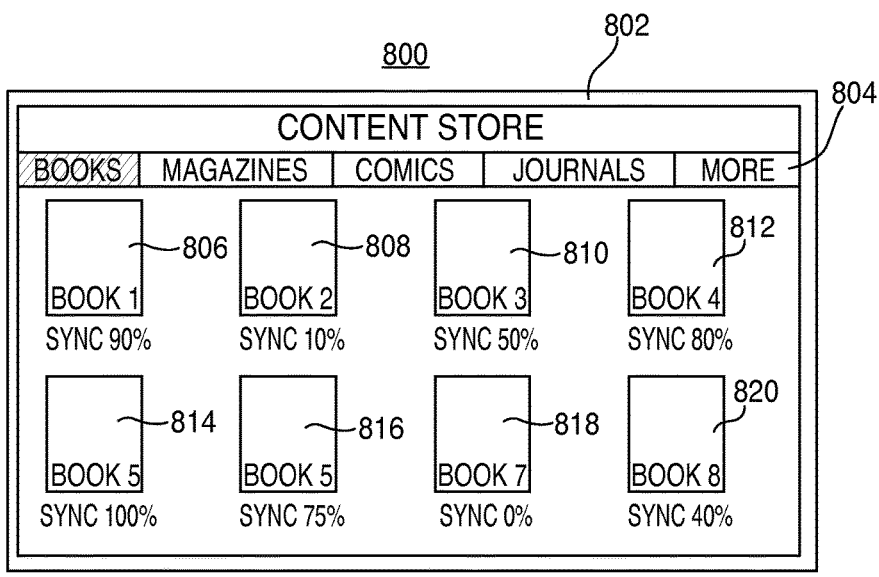
FIG. 8 is another illustrative schematic diagram of a user computing device in which a content store is displayed in accordance with embodiments of the present disclosure.

FIG. 8 is an illustrative schematic diagram of other embodiments in which the use of overall synchronization availability and health metrics for individual content items that can be displayed in content store 800. Content store 800 may include content items for purchase, for license, and/or for free use. Content store 800 may be displayed on a user-computing device, such as device 530 of FIG. 5 (in which case the device could be a laptop, desktop or tablet computer, a mobile smart phone, an electronic book reader (or e-reader), etc.). As shown in FIG. 8, user-computing device 800 includes a display 802 (that is appropriately labeled "Content Store") that includes a banner area 804. Banner area 804, for example, can be used to provide a user with the ability to choose which type of content items the selection should be made from. In this instance, banner 804 is populated with "Books, Magazines, Comics, Journals, More," each of which may be selected by a user, just as "Books" is shown as being selected in FIG. 8 (by the shading).

FIG. 8 also shows, below a banner 804 in which "Books" are selected, a series of books that are being offered by the content store. Books 1-8, labeled respectively as 806, 808 through 820, each can be displayed, for example, with a graphic image of the cover of the book or any other image that relates to the content item (even the images shown in FIG. 8 in which case the books are simply individually numbered suffices). FIG. 8 also shows an overall synchronization availability/health metric for each book (even if one does not exist for a given book, such as Book 7 which shows a metric of 0% synchronization availability). In the illustration shown in FIG. 8, a user might prefer to select Book 1 or Book 5, based on the fact that both of those books have a synchronization availability/health metric of 90% or better, while Book 2 and Book 7 might be avoided since both of those books have a synchronization availability/health metric of 10% or less. In some embodiments, the display of overall synchronization availability/health metrics may be accomplished in other ways, which can be done in addition to the display of a percentage and/or instead of the display of a percentage. For example, content items (in this case books) having a synchronization availability/health metric at or above a first threshold could be displayed as green icons (for example, if that threshold was 80%, then Books 1, 4 and 5 would appear as green icons). If the health metric was below the first threshold, but above a second threshold the books could be displayed as yellow (for example, if the second threshold was 50%, Books 3 and 5 would be displayed), and below that second threshold would require coloring the books red.

By utilizing the overall health metric, a user can be provided with information that would enable them to make informed selections regarding which content to read when the goal is to try to learn or improve their ability to use a given language. In addition, a user might be encouraged to use the synchronized reading style if it was apparent that there are a large number of different synchronized content items to choose from. In addition to providing a user with an overall synchronization availability/health metric, some embodiments can provide the user with a more detailed view of the quality of synchronization for a given content item, and a user might also be provided with the ability to select a portion of the content item from which to begin and end the read-back process instead of the entire content item, such as in the example shown in FIG. 9.

Figure 9:
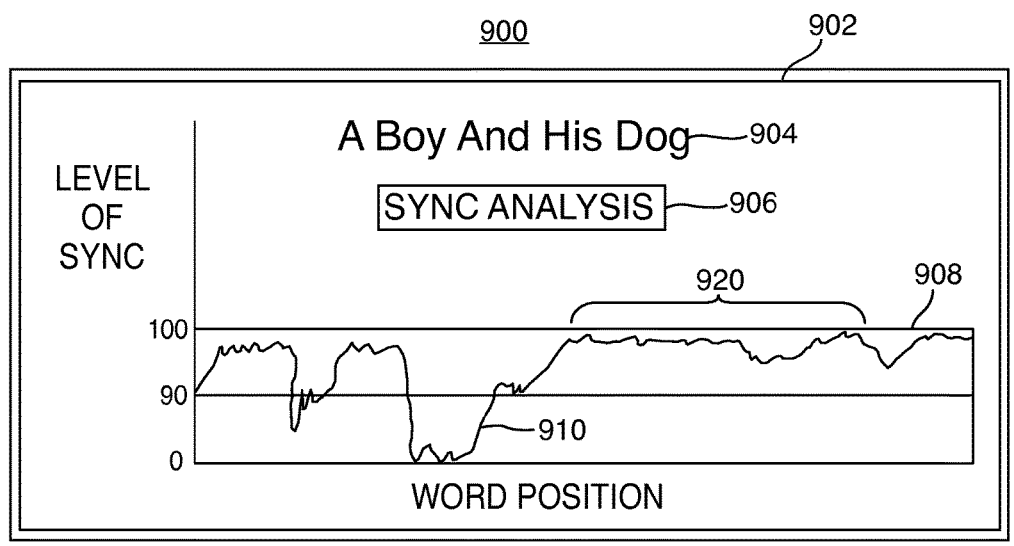
FIG. 9 is another illustrative schematic diagram of a user computing device in which an analysis of the synchronization file for a given content item is displayed in accordance with embodiments of the present disclosure.

FIG. 9 is an illustrative schematic diagram of still other embodiments in which a user-computing device 900 can be used to provide a given user with a more detailed view of the synchronization file for a given content item. In this instance, the user has selected "Books" for the content items, and then selected a specific book called: "A Boy and His Dog." User-computing device 900 includes a display area 902 that shows a title 904 (in this case "A Boy And His Dog"), and a status bar 906 that indicates what is being displayed. In this instance, a Synchronization Analysis has been selected, and that analysis is shown by analysis graph 908. Analysis graph 908 includes graph 910 than can be formed by determining whether synchronization availability exists for each individual textual content element in a given content item, plotting those results along an axis representing the content item from beginning to end, and graphing those points to form graph 910. As is readily apparent from viewing graph 910 in FIG. 9, the content item "A Boy And His Dog" has intermittent synchronization availability issues during the first half of the book, but the second half of the book has relatively high scores for synchronization availability. In that instance, the user might prefer to select only the higher quality sync portion of the content item in order to avoid frustration while waiting for synchronization availability to occur properly. In accordance with embodiments herein, an adjustable selection bar 920 may be made available such that the user could select a limited, far more productive, portion of a content item instead of having to go through the entire read-back process, especially when only a smaller portion of the content item is useful to the user.

In addition, the information that is graphically illustrated via graph 910 can be utilized in other ways to provide a user with the ability to select only portions of a content item that have a higher degree of synchronization availability. For example, an individual content item can be broken down across the word position axis such that a series of selection bars 920 are available. These selection bars can coincide with each chapter in the selected content item, so that the user would be able to select an entire chapter that has better synchronization availability than other chapters, or a series of chapters that has better synchronization availability than other chapters. In this manner, the user would be able to absorb and more enjoy and benefit from the synchronized playback because the playback should be focused from a content perspective. In addition, this type of information, where synchronization metrics are provided for individual chapters for a content item, can be used in connection with the embodiments illustrated in FIG. 8. For example, instead of displaying different content items that each include a synchronization metric, the same type of display can be utilized to display some or all of the chapters of a given content item to assist the user in choosing the most beneficial chapters based on the metrics. The display in FIG. 8 can thus display chapters 1-8 instead of books 1-8, and each of those chapters can include a synchronization rating and/or a colored coded display that graphically illustrates the degree of synchronization (e.g., when synchronization is above 90%, the color could be green, and it could be yellow for synchronization between 75% and 90%, etc.).

Figure 10:
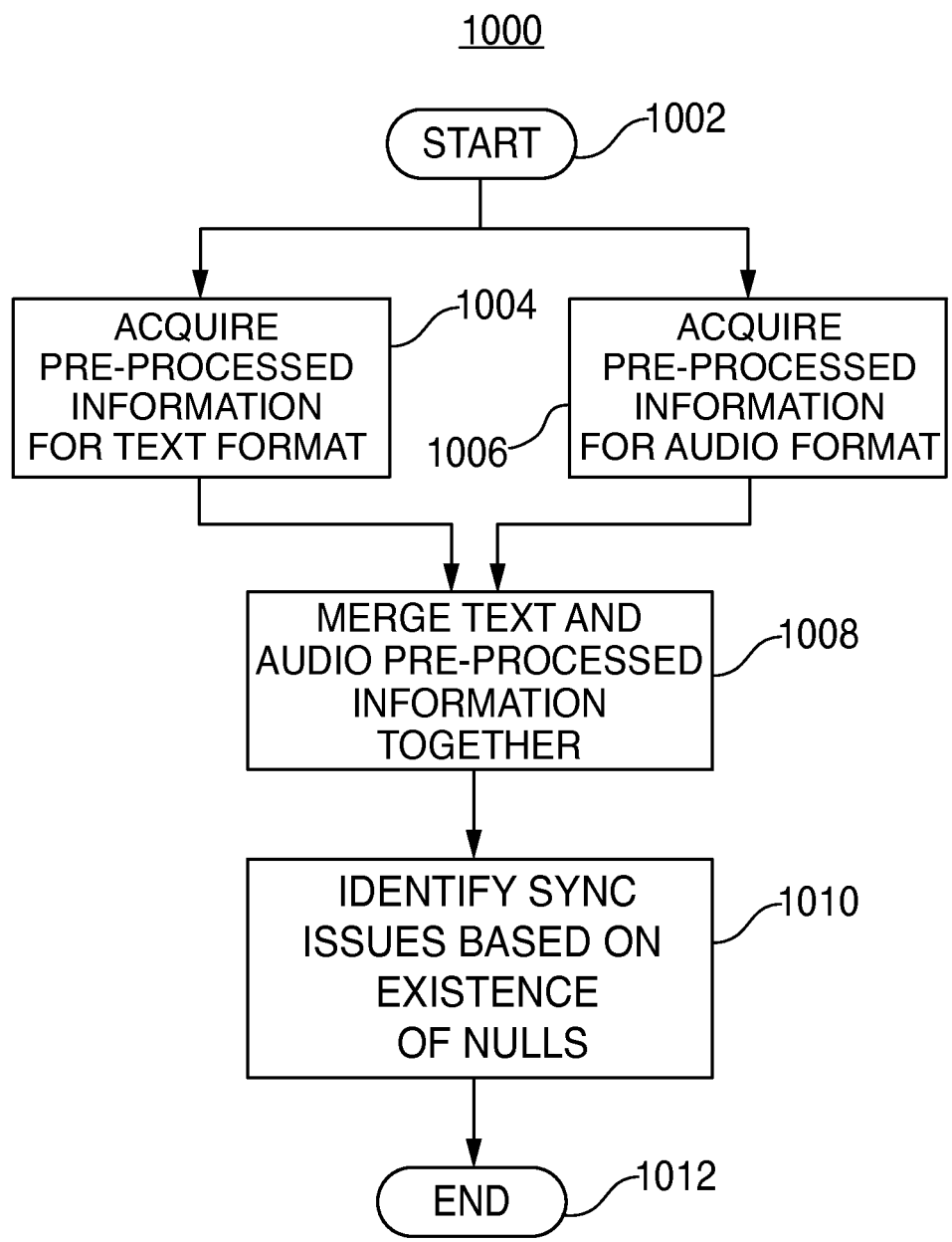
FIG. 10 is a flow diagram of a method of creating a synchronization file that includes pre-processed information and nulls in accordance with embodiments of the present disclosure.

FIG. 10 is a flow diagram of a method 1000 of creating a synchronization file that includes pre-processed information and nulls in accordance with embodiments of the present disclosure. Method 1000 begins at start 1002 and then two steps may occur in parallel or in sequence, but if they occur in sequence, it does not matter which step occurs first, nor which occurs second. As shown, in step 1004, pre-processed information is acquired for a text-formatted file for a given content item, and the pre-processed information shall include both successful identification of the content element and nulls (i.e., where identification is not successfully accomplished). The text-formatted file can be, for example, an electronic reader file, a proprietary e-reader file, a conventional e-reader file, etc. In step 1006, pre-processed information is acquired for an audio-formatted file for the same given content item, and that pre-processed information shall include both successful identification of the content element and nulls. The results of steps 1004 and 1006 are merged together into a single file in step 1008 that results in a series of sequential content elements which each include the pre-processed information and nulls for each content element in both text and audio formats of the given content item. The merged file resulting from step 1008 is analyzed in step 1010 to determine what synchronization issues might occur and when they might occur based on the existence of nulls in the synchronization file. Method 1000 ends at step 1012.

With regard to steps 1004 and 1006, text pre-processing of content elements and audio pre-processing of the same content elements, respectively, may be analyzed to determine which portions of the content elements substantially match text and audio format or correspond to the appropriate portions of the content item (e.g., for alignment). Content synchronization availability information may be generated that reflects correspondences between portions of the audio and text formats for given content elements. Once the pre-processed information is obtained in steps 1004 and 1006, they are merged as described above in step 1008 to form the complete merged synchronization file.

For text processing in step 1004, a time-stamped transcription of audio to be pre-processed is presented with a companion item of text. The time-stamped transcription may include timestamps for each word of the transcript, corresponding to when each word is spoken (or otherwise presented audibly) in the audio format. For example, a word of the time-stamped transcription might be assigned a timestamp of 0:01-0:02, indicating that the word was spoken during that time interval of the audio content. In some embodiments, the time intervals for each word can be generated using known speech processing technologies, such as SOFTSOUND® speech processing technologies available from the Autonomy Corporation, which is headquartered in Cambridge, England, United Kingdom.

In some embodiments, this content alignment can transcribe the audio content using a computer-implemented speech-to-text recognition technique. In addition, a pink noise filter may be applied to the audio content as or before it is transcribed. The pink noise filter may minimize the effect of background music or other ambient noise on the transcription results, so that any words (e.g., narration of an audiobook) audibly presented (e.g., spoken) in the audio content may be more accurately recognized and transcribed. Techniques for transcribing speech to text are well known in the art and need not be discussed in further detail herein. Additionally, in other embodiments, the content alignment service may assign timestamps to a pre-existing transcription, or may obtain a pre-existing transcription that also includes timestamps.

The text may be selected for preliminary alignment to comparable audio. The audio may correspond to, for example, one or more chapters, tracks, movements, etc. of the audio content (if the audio content includes such block divisions), or might correspond to an interval of time in the audio content, such as forty-five minutes, an hour, or any other relatively large or statistically significant interval. The transcription of the audio may be divided into elements corresponding to the elements present in the audio content. The elements of the transcription may then be compared to elements of the textual content to identify similarities between the two. If an element of textual content is sufficiently similar to an element of transcription, the audio content from which the element of transcription was generated may be preliminarily aligned with the element of textual content.

In some embodiments, a correlation measure can be used to determine which elements of audio content should be aligned to which elements of text content. The correlation measure may be based at least in part on words in common between the element of text content and an element of the transcription of the audio content. For example, the correlation measure may measure a number or percentage of words in common between the element of text content and the element of the transcription of the audio content. The correlation measure may also measure the similarity between the probability distribution of words in the element of text content with the probability distribution of words in the element of the transcription, such as by measuring the Kullback-Liebler distance (KLD) between the word distributions of an element of textual content and an element of the transcription. Other correlation measures may be used as desired.

If no element of the transcription can be found with which an element of the text content has a correlation measure satisfying a threshold, the element of text content may be removed from further consideration and replaced with nulls which can be utilized as described in detail above. The selection process described may be repeated sequentially until each element of text content has been either selected for alignment with an element of the transcription or replaced with nulls. All elements of the text content that have not been replaced by nulls should have been aligned with an element of the transcription (and thus, an element of the audio content) to generate a preliminary alignment of the textual content and the transcription.

It will be appreciated that any element of the text content that are not preliminarily aligned to any element of the transcription are likely to represent front matter (such as tables of contents, forewords, etc.) or back matter (such as endnotes, indices, appendices, etc.), as front matter and back matter may not be represented in audio content. Accordingly, the alignment process described with respect to such elements may be used to identify front matter and back matter in the text content, as the elements of textual content whose correlation measure exceeds a threshold are likely to include body text to the exclusion of front matter or back matter, in which case they would be replaced with nulls as described above.

By identifying front matter, the content alignment process may advantageously locate a presentation position in the text content element at which synchronous presentation of the audio content element may begin, as front matter is unlikely to be narrated by the audio content elements. Likewise, by identifying back matter, the content alignment may similarly locate a presentation position in the text content elements at which synchronous presentation of the audio content elements may cease, as back matter is also unlikely to be narrated in the item of audio content, in which case that location in the synchronization file would be replaced by nulls.

Other methods of identifying front matter and back matter in a content item are possible and within the scope of the present disclosure. In some embodiments, input from a human interaction task system may be obtained to identify front and back matter in a content item. For example, some or all of the textual content elements may be presented to a human worker of the human interaction task system. A question may also be presented to the human worker, such as "Please identify any regions of front matter or back matter in this content item." The human worker may then interact with a computing device of the human interaction task system to indicate which elements of the content item contain front matter or back matter, and the results may be routed to the content alignment service for use in generating a preliminary alignment. In other embodiments, front matter, back matter, or other uncertain regions can be identified by metadata (such as via a manual markup), which may be provided with the textual content elements. This metadata may be provided, for example, by a publisher or author of the content item, or by a user of the content item. Regardless of how front and back matter is identified in the content item, the elements of front matter and back matter may be replaced with nulls in the synchronization file.

In some embodiments, the time-stamps of the words in an element of the transcription of the audio content are used to assign timestamps to words in the preliminarily aligned element of text content. The timestamp assigned to a word in the element of text content may represent a prediction or hypothesis that the word is audibly presented in the audio content during the time interval specified by the timestamp. This prediction or hypothesis may be based at least in part on the timestamps assigned to the words in the transcription. In some embodiments, timestamps are assigned to words of the element of textual content elements in this way by using SOFTSOUND® speech processing technologies developed by the Autonomy Corporation, substantially as discussed above.

In still other embodiments, time-stamps are assigned to words of an element of textual content without necessarily referring to the element of the time-stamped transcription. Accordingly, time heuristics that can determine a time-stamp for a word of the text content may be used. In some embodiments, the timestamp for a word of the text content is estimated based at least in part on the number of letters of the word of the text content. In other embodiments the time-stamp for a word of the text content is estimated based at least in part on the number of syllables of the word of the text content. For example, the first word of the element of text content may be assigned a time-stamp that corresponds to the beginning of the element of text content (e.g., from 0:00-0:01 seconds). The second word of the element of text content may be assigned a timestamp that starts at the end of the first word and continues for the length of the second word (e.g., from 0:01-0:02 seconds).

In still other embodiments, time-stamps are assigned to words of an element of textual content on a sequential basis. Generally described, the words of the time-stamped transcription and the words of the element of text content may be assigned to sequential numbers. Based on the time-stamp of a word of the time-stamped transcription, a sequentially corresponding word of the element of text content may be assigned a substantially similar time-stamp. An example will be illustrative. A first word of the element of the time-stamped transcription may be assigned a time-stamp of 0:00-0:01 seconds. Accordingly, the first word of the element of text content may be assigned a timestamp of 0:00-0:01 seconds. A second word of the element of the time-stamped transcription may be assigned a time-stamp of 0:01-0:02 seconds. Accordingly, the second word of the element of text content may be assigned a time-stamp of 0:01-0:02 seconds.

Figure 11:
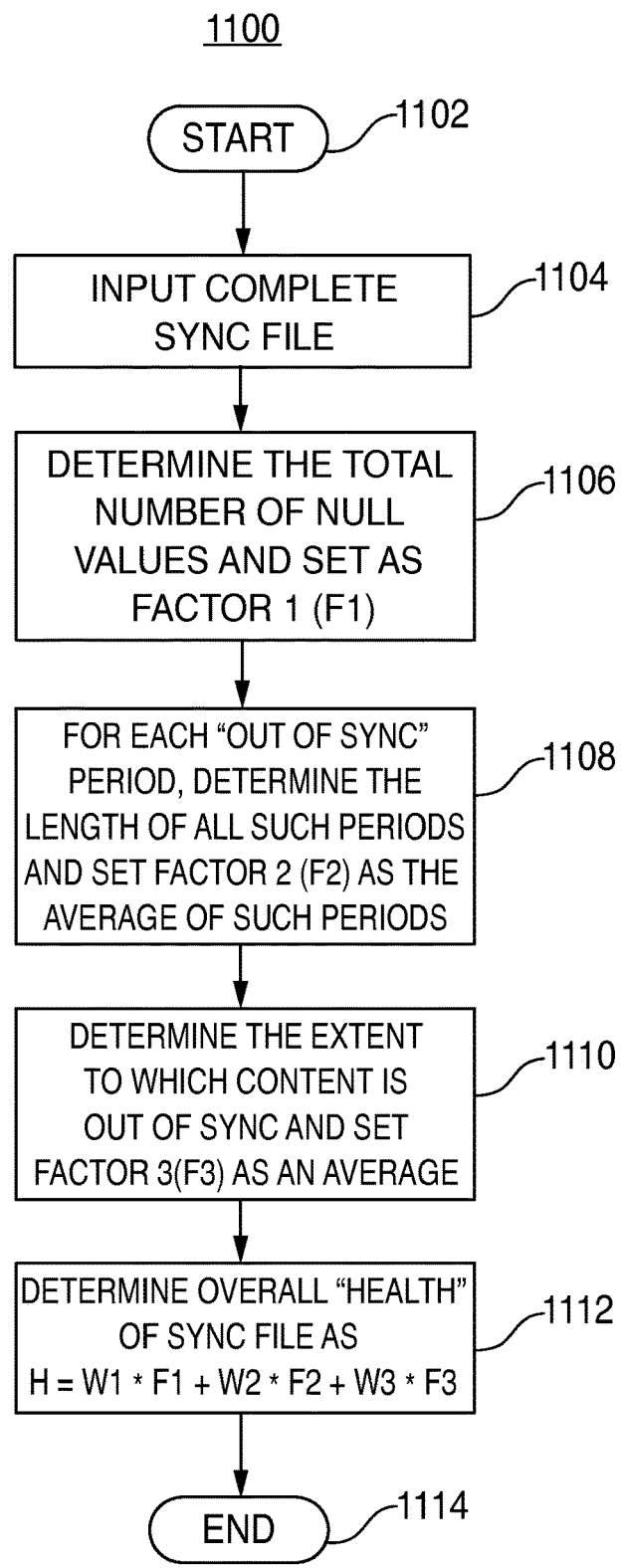
FIG. 11 is a flow diagram of a method of creating an overall metric indicative of the synchronization availability/health of a synchronization file in accordance with embodiments of the present disclosure.

As an illustrative example of a corresponding word, the word "tiger" may be spoken during the time interval 0:01-0:03 (seconds) in an element of audio content, and the transcription of the word "tiger" may include a time-stamp indicating that "tiger" was spoken during the time interval 0:01-0:03. The element of text content may also contain the word "tiger," and the content alignment service may assign a timestamp to the word "tiger" corresponding to a 0:01-0:03 time interval in the element of text content, based on one or more of the ways to assign time-stamps to words in an item of text content discussed above. Accordingly, because the word "tiger" appears in both the text content and the transcription during the same time interval, the word "tiger" may be determined to be a corresponding word. On the other hand, if the word "tiger" only appeared in either the textual content or the transcription, the synchronization file corresponding to the missing "tiger" would be replaced by nulls FIG. 11 is a flow diagram of a method 1100 of creating an overall synchronization health metric for a synchronization file that includes pre-processed information and nulls in accordance with embodiments of the present disclosure. Method 1100 begins at start 1102. In step 1104, the synchronization file is input (or received) for analysis. In step 1106 the synchronization file is analyzed to count the number of nulls that exist in the synchronization file for a given content item, and a first factor F1. The synchronization file is then analyzed again, in step 1108, to determine the total length of time each null period lasts and then averages those out and sets the average a the second factor F2. In step 1110, the synchronization file is again reviewed to determine the extent to which content is unavailable for synchronous presentation, in which case that measurement is also averaged and set as third factor F3. Once all of the factors have been determined, in a step 1112, the overall synchronization health metric can be determined by setting a weight for each factor and adding the three results together. Persons skilled in the art will appreciate that any of the weights can be assigned a value of zero, thereby removing that factor from that particular metric measurement. Method 1100 ends at step 1114.

Figure 12:
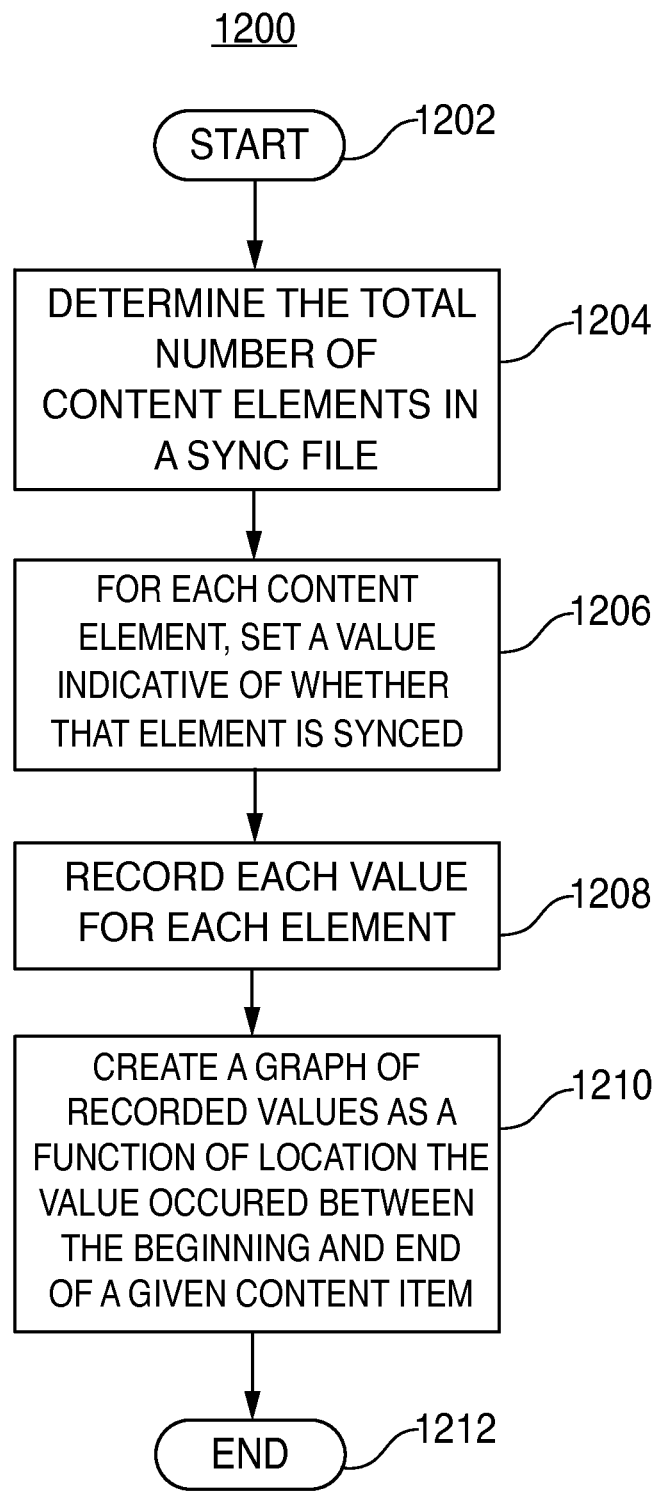
FIG. 12 is a flow diagram of a method of creating a graphic representation of a synchronization file that includes an indication of the availability of synchronous presentation of audio and text versions of a content item in accordance with embodiments of the present disclosure.

FIG. 12 is a flow diagram of a method 1200 of creating a graphic representation of synchronization availability from data in a synchronization file that includes pre-processed information and nulls in accordance with embodiments of the present disclosure. Method 1200 begins at start 1202. In step 1204, the synchronization file is analyzed to determine the total number of individual content elements that are present in the synchronization file. In step 1206, the synchronization data is analyzed for each of the content elements to determine whether pre-processed information is present or if a null is present, and a value is set corresponding to the result of that analysis. In step 1208, each one of the values determined in step 1206 is recorded. Persons skilled in the art will appreciate that steps 1206 and 1208 can instead be performed in a loop as a pair of steps individually for each content element, until each of the elements has been analyzed (in which case, step 1208 would then end after the last element was analyzed and recorded). In step 1210, each of the recorded values is plotted on a graph as a function of the location where the value occurred between the beginning and the end of the given content item. Once all of the values have been plotted, a graphic curve is overlaid to present a graphic representation of the synchronization file for a given content item. Method 1200 ends at step 1212.

Figure 13:
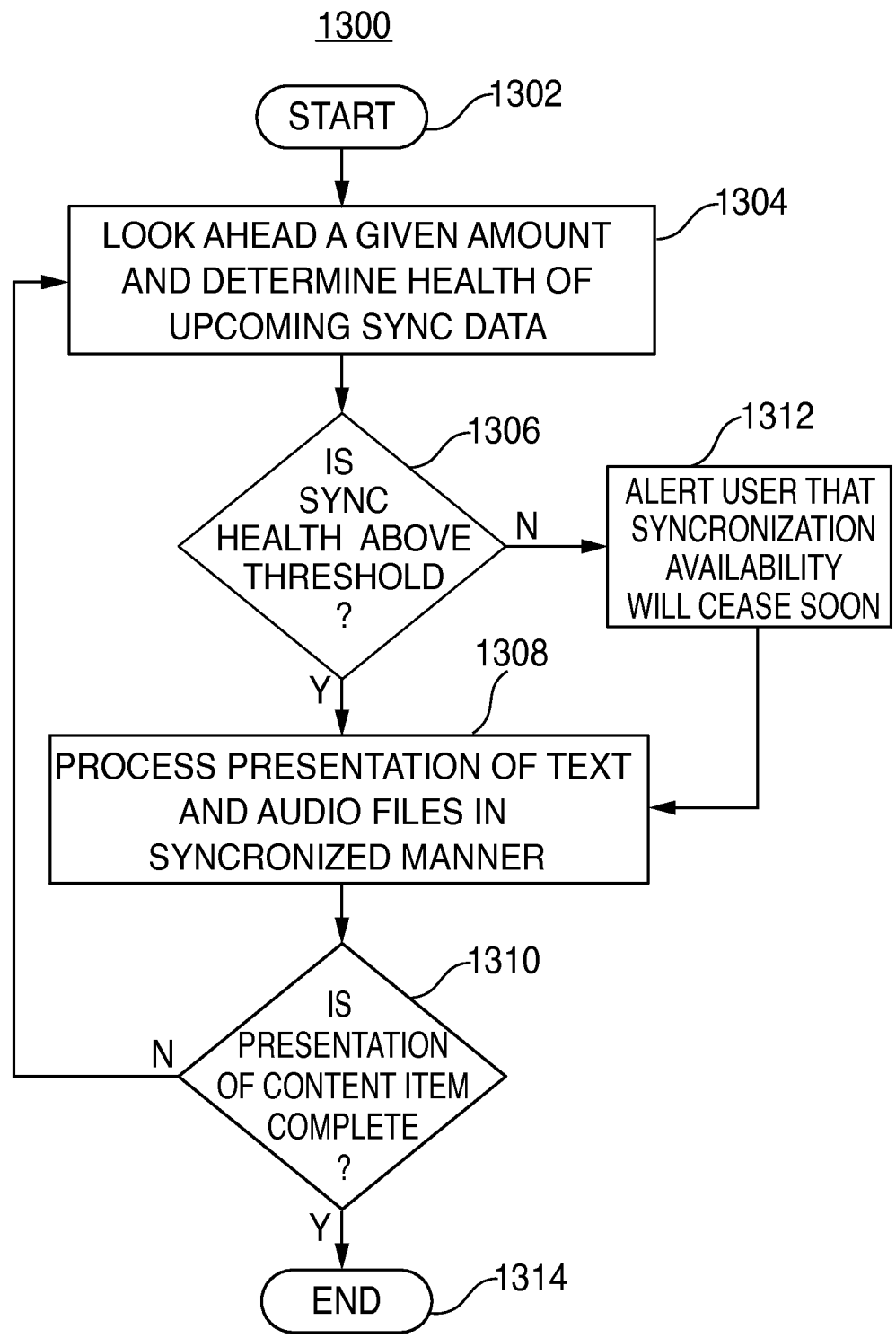
FIG. 13 is a flow diagram of a method of providing a user with alerts related to synchronization availability in accordance with embodiments of the present disclosure.

FIG. 13 is a flow diagram of a method 1300 of providing a user with alerts related to whether of not synchronization will be available in accordance with embodiments of the present disclosure. Method 1300 begins at start 1302. In step 1304, the synchronization file is examined for a predetermined amount of time beyond the current play-back location (which starts at zero), to determine the health of the upcoming synchronization data. In step 1306, a test is conducted to determine whether the look-ahead view of health from step 1304 is above a predetermined threshold that indicates that synchronization is available ahead in the play-back. If the look-ahead view is above threshold, then step 1308 occurs and presentation of the text and play-back of the audio files occurs in a synchronized manner continues. If the look-ahead view is not above the threshold, then step 1312 occurs and the user is alerted that synchronization availability will soon be stopped. This alarm can be accomplished in various different ways in accordance with different embodiments, some of which were described above with respect to FIG. 7. For example, in some embodiments, an icon can be displayed that may start flashing as the presentation of content gets closer to losing the ability to be accomplished in a synchronized manner. In other embodiments, a countdown clock can be displayed that estimates for the user when synchronization availability will end. In still other embodiments, a count-down clock could again be provided to the user to notify the user how long it might be until synchronized presentation of the content can resume. And in other embodiments, the alarm provided to the user may be a change in color of the background display, such that the color displayed when synchronized presentation is available is a light green, which transitions to yellow as a loss of synchronization availability is detected during upcoming playback. That yellow color could transition to red as the loss of synchronization availability gets closer, before turning into a blinking red when the loss of synchronization availability is eminent. Persons skilled in the art will appreciate that it may be beneficial to use more than one of theses alarms at the same time to insure that the user is aware of what is happening during presentation of the content.

Once the alarm has been provided to the user is step 1312, presentation of the content continues in step 1308 (it should also be noted that for all practical intent, presentation essentially continues while the alert is provided to the user, rather than ceasing operation until the alarm has been completed). After a predetermined amount of presentation of the content occurs during step 1308, a test is conducted in step 1310 to determine whether presentation of all of the content for the given content item is complete. If the presentation is not complete, the process returns to step 1304, where the look-ahead step is conducted again. If play-back is complete, method 1300 ends at step 1314.

Figure 14:
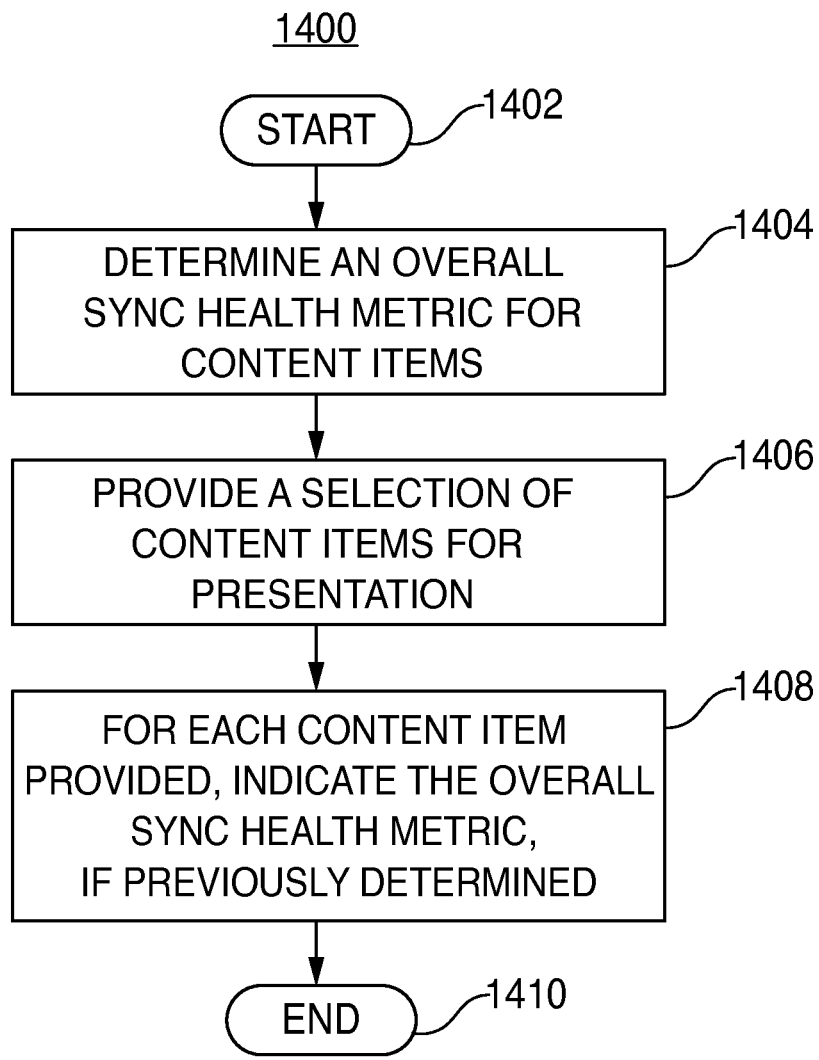
FIG. 14 is a flow diagram of a method of presenting several contents items to a user and also providing an overall synchronization availability/health indicator for each content item displayed in accordance with embodiments of the present disclosure.

FIG. 14 is a flow diagram of a method 1400 of presenting several contents items to a user and also providing an overall synchronization availability/health indicator for each content item displayed in accordance with embodiments of the present disclosure. Method 1400 begins at step 1402, and is intended to apply to instances where a user may be browsing through a content store (in which the user may purchase, license or obtain for free, content items for play-back; the requirement for payment may be based on a content item-by-content item basis, depending on who has the rights to the content item and the requirements that are placed on the distribution of that content item). As shown in FIG. 8 and described above, a content store can be configured to provide a user with a list of general types of content items that might be available, such as books, magazines, newspapers, comics, journals, etc. It is intended that method 1400 take place after the user has chosen the specific type of content to browse, such as by selecting "Books" in bar 804 of FIG. 8.

In step 1404 an overall synchronization availability/health metric is determined for content items of the type that may have been selected by the user. The determination of the availability/health metric may be as simple as looking up the information that was previously determined, for example, such as through method 1100. Or, the determination of the availability/health metric may require performing method 1100 for each individual content item of the type being browsed. Another alternative is that a combination might be needed, such as, for example, in the case where a majority of the content items have already been evaluated and am overall synchronization availability/health metric has been assigned that may be looked up, while several other content items have no predetermined metric and method 1100 must be applied to them prior to continuing.

Once all of the health metrics that can be determined have been determined in step 1404 (there may be some content items for which a health metric simply cannot be established), step 1406 occurs whereby a selection of content items of the selected type are displayed for "purchase" selection (which, as stated earlier, does not necessarily mean that a purchase must occur in order to obtain a particular content item). At basically the same time at the selected content items are displayed, step 1408 occurs whereby the health metrics that were determined in step 1404 are displayed in connection with the content items that are displayed.

The display of the health metrics in step 1408 can be accomplished in many different ways. For example, an actual number or percentage could be displayed next to each content item. In other embodiments, the determined health metric could be converted to a color that is indicative of the health of the synchronization data (e.g., green could be used to indicate good health, while red could be used to indicate bad health). In that instance, the icon of the content item being displayed could change to the appropriate color, or the background underneath the content item could be changed to reflect the color that correlates to a given metric. In other embodiments, the content items for a given content type may be organized based on the value of the health metric and only those content items having an acceptable metric might be displayed. Persons skilled in the art will appreciate that some or all of these various embodiments could be used together in a single embodiment in order to provide the user with maximum information related to the content items being viewed. Once the health metric and the content items have been displayed, method 1400 ends at step 1410.

The various embodiments described herein may be implemented using a variety of means including, but not limited to, software, hardware, and/or a combination of software and hardware. Furthermore, the above-described embodiments are presented for the purposes of illustration and are not to be construed as limitations.

What is claimed is:

1. A method for providing information regarding a quality of synchronization availability between a first audio version of a first content item and a first text version of the first content item, the method comprising:
 obtaining, by one or more processors of a content-provider system, the first audio version of the first content item;
 analyzing, by the one or more processors, the first audio version of the first content item to identify:
  audio data that identifies first audio portions of the first audio version that are available for synchronization; and audio null data that identifies second audio portions of the first audio version that are not available for synchronization;

obtaining, by the one or more processors, the first text version of the first content item;

analyzing, by the one or more processors, the first text version of the first content item to identify:
 text data that identifies first text portions of the first text version that are available for synchronization; and
 text null data that identifies second text portions of the first text version that are not available for synchronization;

generating, by the one or more processors, synchronization file information representing:
 the audio data that identifies the first portions of the first audio version that are available for synchronization;
 the audio null data that identifies the second portions of the first audio version that are not available for synchronization;
 the text data that identifies the first text portions of the first text version that are available for synchronization; and
 the text null data that identifies the second text portions of the first text version that are not available for synchronization;

determining, based at least in part on the audio null data and the text null data, total null data, the total null data comprising:
 a total number of nulls represented in the audio null data and text null data;
 a total amount of time that the nulls exist; and
 an average amount of time that each of the nulls exist;

calculating, by the one or more processors, a first value based at least in part on the total null data, the value indicating an overall quality of synchronization availability between the first audio version of the first content item and the first text version of the first content item;

providing, to a client device, a first indication of the first content item and the first value;

providing, to the client device, a second indication of a second content item and a second value for the second content item, the second value indicating an overall synchronization availability between a second audio version of the second content item and a second text version of the second content item;

receiving, from the client device, a selection of the first content item for consumption, wherein the first value is greater than the second value; and sending the first content item to the client device.

2. The method of claim 1, wherein the first value comprises a percentage of the total number of nulls compared to a total number of portions of the first content item that are available for synchronization.

3. A method for determining synchronization availability for simultaneous presentation of a first audio version of a first content item and a first text version of the first content item, the method comprising:
 receiving null data comprising at least one of:
  audio null data that identifies audio portions of the first audio version that are not available for synchronization; or
  text null data that identifies first text portions of the first text version that are not available for synchronization;
 receiving text data that identifies second text portions of the first text version that are available for synchronized presentation;
 receiving audio data that identifies second audio portions of the first audio version that are available for synchronized presentation;
 determining that nulls represented in the null data occur for more than a predefined period of time;
 generating a first indicator based at least in part on the nulls occurring for more than the predefined period of time, the first indicator being indicative of an overall synchronization availability between the first audio version of the first content item and the first text version of the first content item;
 providing, to a user device, a first indication of the first content item and the first indicator;
 providing, to the user device, a second indication of a second content item and a second indicator for the second content item, the second indicator indicating an overall synchronization availability between a second audio version of the second content item and a second text version of the second content item;
 receiving, from the user device, a selection of the first content item for consumption; and
 sending the first content item to the user device.

4. The method of claim 3, wherein the predefined period of time is at least 0.5 seconds.

5. The method of claim 3, further comprising:
 analyzing the null data to determine a value representing a total time the nulls occur as compared to a total time of the first audio version of the first content item; and
 determining the overall synchronization availability of the first content item based at least in part on the value.

6. The method of claim 3, further comprising:
 calculating an amount of time during which synchronization is unavailable due to a null of the nulls.

7. The method of claim 4, further comprising:
 determining that the amount of time is greater than the predefined period of time.

8. The method of claim 3, wherein audio nulls represented by the audio null data for the first audio version indicate an amount of time of that the first audio version is not available for synchronized presentation.

9. The method of claim 8, further comprising calculating an average amount of time in which the audio nulls and text nulls exist, the average amount of time indicating an average duration where the first audio version or the first text version is not available for synchronization.

10. The method of claim 8, further comprising: determining a total amount of time that the nulls exist for the first content item.

11. The method of claim 3, further comprising:
 calculating a first number of occurrences where the first audio version is not available for synchronization for more than the predefined period of time;
 calculating a second number of occurrences where the first text version is not available for synchronization for more than the predefined period of time;
 determining a total number of occurrences based on the first number of occurrences for the first audio version and the second number of occurrences for the first text version;
 determining an average amount of time of the nulls where synchronization between the first audio version and the first text version is not available; and determining a total amount of time where synchronization is not available between the first audio version and the first text version.

12. The method of claim 11, further comprising:
determining a first weight for the total number of occurrences where synchronization is not available for more than the predefined period of time;
determining a second weight for the average amount of time;
determining a third weight for the total amount of time; and
generating the overall synchronization availability of the first content item based at least in part on the first weight, the second weight, and the third weight.

13. A method comprising:
obtaining, by one or more processors, a first audio version of a first content item;
obtaining, by the one or more processors, a first text version of the first content item;
generating, by the one or more processors and based at least in part on the first audio version and the first text version, synchronization file data, the synchronization file data including:
  null data comprising at least one of:
    audio null data that identifies first audio portions of the first audio version that are not available for synchronization with the first text version; or
    text null data that identifies first text portions of the first text version that are not available for synchronization with the first audio version; and
  synchronized data comprising:
    audio synchronized data that identifies second audio portions of the first audio version that are available for synchronization with the first text version; and
    text synchronized data that identifies second text portions of the first text version that are available for synchronization with the first audio version;
analyzing the null data and the synchronized data to identify one or more factors indicating synchronization availability between the first audio version of the first content item and the first text version of the first content item;
calculating, based at least in part on the one or more factors, a first overall synchronization value indicating an overall synchronization availability between the first audio version of the first content item and the first text version of the first content item;
providing a first indication of the first content item and the first overall synchronization value to be presented on a display of a client device;
providing a second indication of a second content item and a second overall synchronization value for the second content item to be presented on the display of the client device, the second overall synchronization value indicating an overall synchronization availability between a second audio version of the second content item and a second text version of the second content item;
receiving, from the client device, a selection of the second content item for consumption, wherein the second overall synchronization value is greater than the first overall synchronization value; and
at least partly responsive to receiving the selection of the second content item for consumption, sending the second content item to the client device.

14. The method of the claim 13, wherein the one or more factors comprise at least one of:
a total number of nulls represented in the null data;
a total amount of time that synchronization between the first audio version and the first text version is not available due to the nulls;
an average amount of time that each of the nulls exist; or
a ratio between the total amount of time that synchronization between the first audio version and the first text version is not available due to the nulls and a total duration of the first audio version.

15. The method of claim 14, wherein calculating the overall synchronization value includes at least one of:
determining that the total number of nulls is greater than a threshold number of nulls;
determining that the total amount of time that synchronization is not available due to the nulls is greater than a threshold amount of time; or
determining that the average amount of time that each of the nulls exist is greater than a threshold average amount of time.

16. The method of claim 13, further comprising:
providing an indication of the null data to a developer device associated with managing the synchronization file data;
receiving input from the developer device, the input correcting at least one null of the nulls;
updating the null data based at least in part on the input; and
calculating an updated overall synchronization value indicating the overall synchronization availability between the first audio version of the first content item and the first text version of the first content item, wherein the updated overall synchronization value is greater than the first overall synchronization value.

* * * * *